United States Patent
Lu (10) Patent No.: US 9,033,292 B2
(45) Date of Patent: May 19, 2015

(54) LOAD SUPPORTING APPARATUS

(71) Applicant: Chin Chang Lu, Corona, CA (US)

(72) Inventor: Chin Chang Lu, Corona, CA (US)

(73) Assignee: Continew Inc., New Taipei (TW)

( * ) Notice: Subject to any disclaimer, the term of this patent is extended or adjusted under 35 U.S.C. 154(b) by 0 days.

(21) Appl. No.: 13/971,917

(22) Filed: Aug. 21, 2013

(65) Prior Publication Data

US 2015/0053829 A1    Feb. 26, 2015

(51) Int. Cl.
| F16M 13/00 | (2006.01) |
| F16M 13/02 | (2006.01) |
| F16M 11/06 | (2006.01) |
| F16G 13/16 | (2006.01) |
| F16M 11/04 | (2006.01) |
| F16M 11/12 | (2006.01) |
| D06F 75/28 | (2006.01) |

(52) U.S. Cl.
CPC ............. *F16M 13/022* (2013.01); *F16M 11/06* (2013.01); *F16G 13/16* (2013.01); *F16M 11/04* (2013.01); *D06F 75/28* (2013.01); *F16M 11/12* (2013.01); *Y10S 248/917* (2013.01)

(58) Field of Classification Search
CPC ........ F16M 11/04; F16M 11/12; F16G 13/16; G06F 1/16; D06F 75/28
USPC ........... 248/123.11, 282.1, 284.1, 917, 278.1, 248/280.11, 121, 51, 52; 361/679.21, 361/679.22, 679.06, 679.07
See application file for complete search history.

(56) References Cited

U.S. PATENT DOCUMENTS

| 3,141,359 | A | * | 7/1964 | Bennett et al. | .................. 174/50 |
| 4,910,362 | A | * | 3/1990 | Kinner | .......... 174/135 |
| 5,246,189 | A | * | 9/1993 | Compton | ........ 248/52 |
| 6,478,275 | B1 | | 11/2002 | Huang | |
| 7,188,812 | B2 | * | 3/2007 | Wang | ......... 248/276.1 |
| 7,510,155 | B2 | * | 3/2009 | Huang et al. | .............. 248/278.1 |
| 7,726,616 | B2 | * | 6/2010 | Zhang et al. | ............... 248/284.1 |
| 7,810,773 | B2 | * | 10/2010 | Chi | ............................ 248/278.1 |
| 8,011,632 | B2 | * | 9/2011 | Wang et al. | .................. 248/284.1 |
| 8,070,114 | B2 | * | 12/2011 | Chen | ............................ 248/121 |
| 2005/0141180 | A1 | * | 6/2005 | Umeda et al. | ................. 361/681 |
| 2011/0260017 | A1 | | 10/2011 | Monsalve et al. | |

* cited by examiner

*Primary Examiner* — Anita M King
(74) *Attorney, Agent, or Firm* — Alan D. Kamrath; Kamrath IP Lawfirm, P.A.

(57) ABSTRACT

A load-supporting apparatus includes four levers each including first and second ends, a pushing element, a hanging element and an extending device. The first end of the second lever is connected to the second end of the first lever. The first end of the third lever is connected to the second end of the second lever. The first end of the fourth lever is connected to the second end of the third lever. The second end of the fourth lever is connected to the first end of the first lever. A first end of the pushing element is connected to the first lever. A first end of the hanging element is connected to a second end of the pushing element. A first end of the extending device is connected to the first end of the hanging element. The second end of the extending device is placed against the second lever.

9 Claims, 8 Drawing Sheets

LOAD SUPPORTING APPARATUS

BACKGROUND OF INVENTION

1. Field of Invention

The present invention relates to a load-supporting apparatus and, more particularly, to a linkage for supporting a load.

2. Related Prior Art

As disclosed in U.S. Pat. No. 6,478,275, a conventional support device includes a base 10, a bracket 20, an arm 30, a lever 40 and a spring 50. The bracket 20 is used to carry an object. The arm 30 is pivotally secured to the base 10 with a shaft 31. The lever 40 is secured to the base 10 with a rod 42. The lever 40 includes a curved groove 43 for slidably receiving the shaft 31 and an orifice 41 for loosely receiving the rod 42. The base 10 includes a stop 11 for engaging and latching the lever 40 with the base 10, without additional fasteners, when the lever 40 is elevated relative to the base 10. The spring 50 includes an end placed against the rod 42 and another end placed against the arm 30 so that the spring 50 tends to keep the arm 30 in a vertical position when the base 10 is placed on a horizontal surface. The use of this conventional support device is however not without any problem. At first, the support device is not adaptable to the height of a user. A tall user would like to have the support device to pivot in a small range so that the position of the object such as a display would not be too low. A short user would like to have the support device to pivot in a large range so that the position of the object could be adequately low. Such adjustment is impossible without any device for adjusting the preload of the spring 50. Moreover, the support device is allowed to pivot in a range limited by slots 33 made in the arm 30 and slots 43 made in the lever 40.

As disclosed in US Patent Application Publication No. 2011/0260017, a conventional adjustable support arm includes a parallelogram linkage that includes a lower bracket 210, an upper bracket 290, an upper link 240 and a lower link 250. A spring 260 counterbalances the weight of an object carried on the upper bracket 290. A first end of the spring 260 is attached to the upper link 240 by a threaded bolt 268 and a screw cap 269. The threaded bolt 268 and the screw cap 269 are used to adjust preload of the spring 260. A second end of the spring 260 is attached to a drag link 280 to provide a dynamic attachment point that automatically adjusts as the support arm is moved between upper and lower positions. Two pivot links 270 and 275 or two slots 253 and 255 in the lower link 250 are used to guide the movement of the drag link 280 as the height of the support arm is adjusted. The support arm is adaptable to a tall user by rotating the threaded bolt 268 relative to the screw cap 269 in a direction to increase the preload of the spring 260. The support arm is adaptable to a short user by rotating the threaded bolt 268 relative to the screw cap 269 in an opposite direction to reduce the preload of the spring 260. However, the support arm is allowed to pivot in a range limited by the length of the pivot links 270 and 275 or the slots 253 and 255.

Therefore, the present invention is intended to obviate or at least alleviate the problems encountered in the prior art.

SUMMARY OF INVENTION

It is the primary objective of the present invention to provide an effective load-supporting apparatus.

To achieve the foregoing objectives, the load-supporting apparatus includes a four-bar linkage, a pushing element, a hanging element and an extending device. The four-bar linkage includes four levers each including first and second ends. The first end of the second lever is connected to the second end of the first lever. The first end of the third lever is connected to the second end of the second lever. The first end of the fourth lever is connected to the second end of the third lever. The second end of the fourth lever is connected to the first end of the first lever. Each of the pushing element, the hanging element and the extending device includes first and second ends. The first end of the pushing element is connected to a portion of the first lever between the first and second ends. The first end of the hanging element is connected to the second end of the pushing element. The first end of the extending device is connected to the first end of the hanging element. The second end of the extending device is placed against a portion of the second lever between the first and second ends.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Referring to FIGS. 1 to 5, a load-supporting apparatus 10 includes a four-bar linkage according to the preferred embodiment of the present invention. The four-bar linkage includes levers 12, 14, 16 and 18. Each of levers 12, 14 and 16 includes a middle portion extending between two parallel fins. Accordingly, there are two identical levers 18. Each lever 18 is a flat element. Load-supporting apparatus 10 further includes a pushing element 20, two hanging elements 22 and an extending device 24. Pushing element 20 includes a middle portion extending between two parallel fins. Each hanging element 22 is a flat element.

Figures 1, 9:
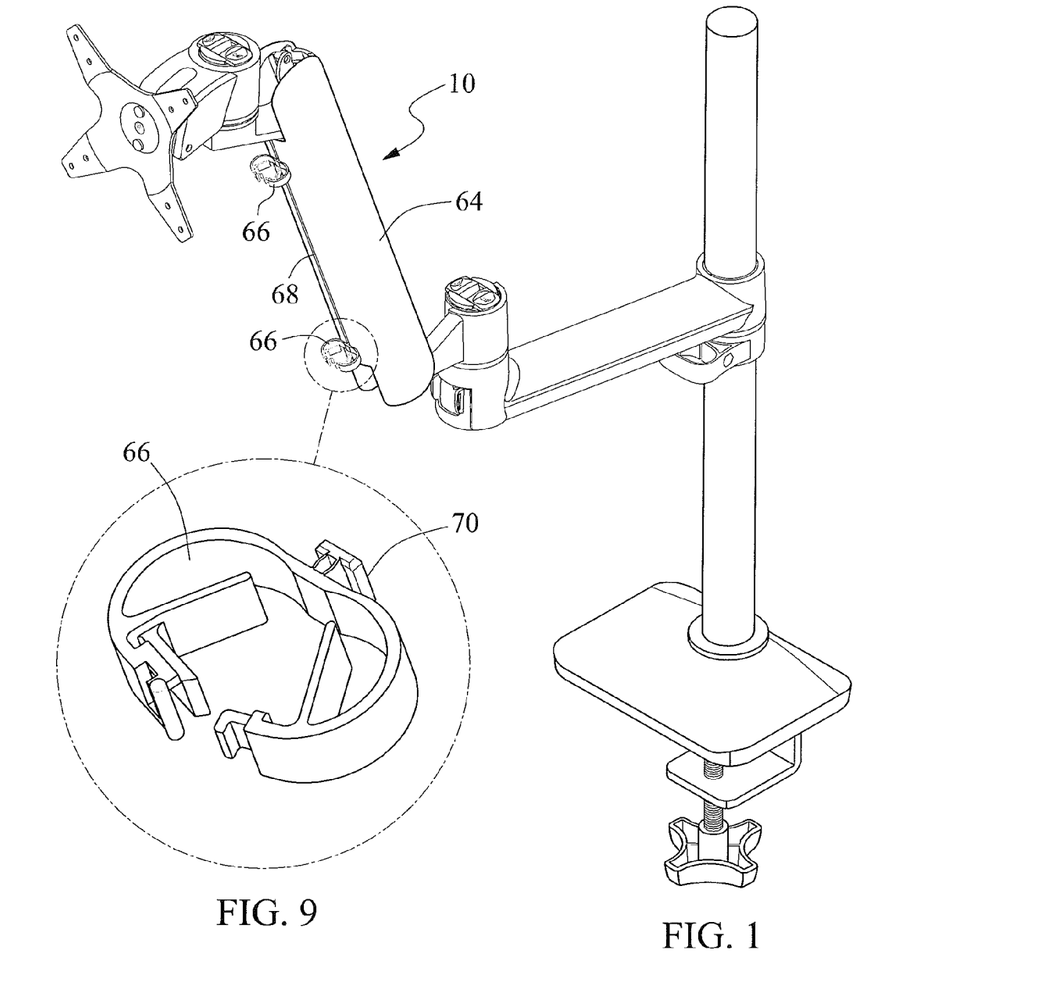
FIG. 1 is a perspective view of a load-supporting apparatus according to the preferred embodiment of the present invention.
FIG. 9 is an enlarged partial view of the load-supporting apparatus shown in FIG. 1.
Figure 2:
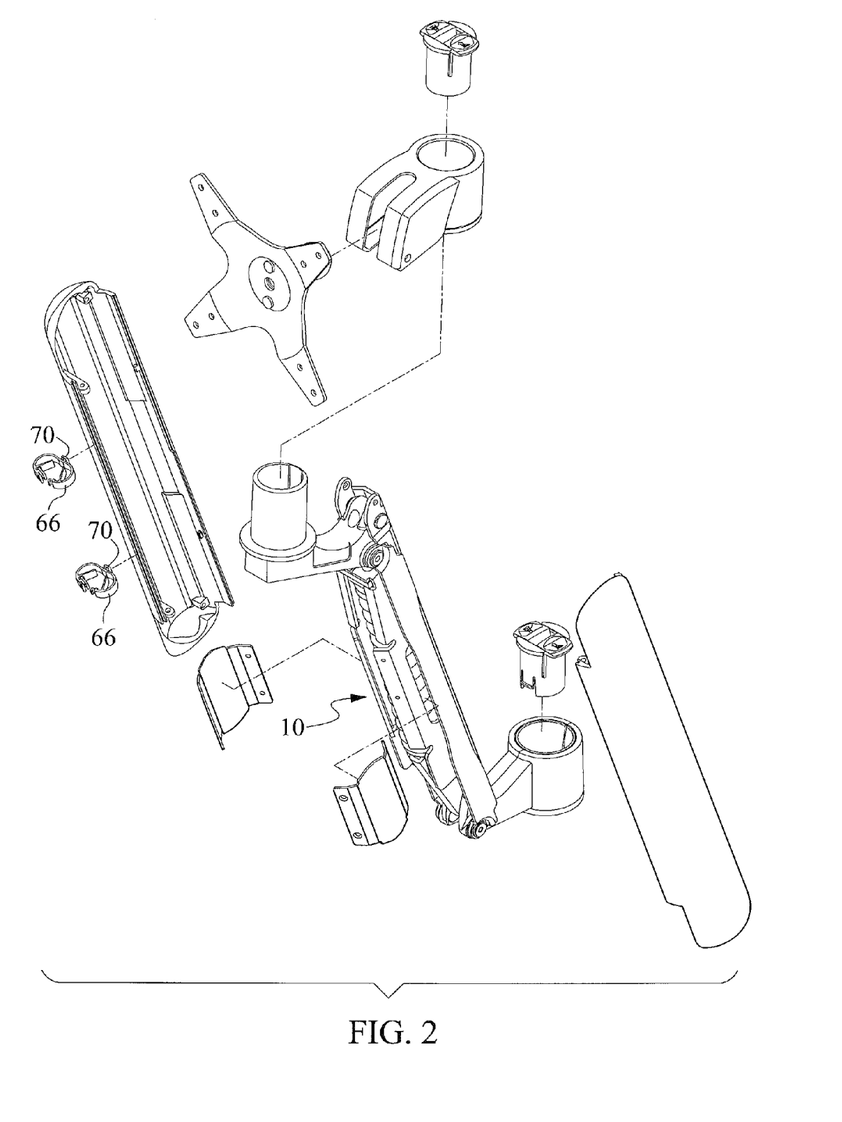
FIG. 2 is an exploded view of the load-supporting apparatus of FIG. 1.

Lever 12 is formed with first and second ends. There is a rivet 32 for connecting the second end of lever 12 to a first end of lever 14. There is a rivet 34 for connecting a second end of lever 14 to a first end of lever 16. There is a rivet 36 for connecting a second end of each fin of lever 16 to a first end of a corresponding lever 18. There is a rivet 38 for connecting a second end of lever 18 to the first end of lever 12.

There is a rivet 40 for connecting a first end of pushing element 20 to a portion of lever 12 between the first and second ends. There is a pin 42 for connecting a second end of each fin of pushing element 20, a first end of a corresponding hanging element 22 and a first end of extending device 24 to one another. A second end of extending device 24 is placed against a proper portion of lever 14. Finally, there is a rivet 44 for connecting a second end of each hanging element 22 to a portion of a corresponding fin of lever 14 between the first and second ends.

Figure 3:
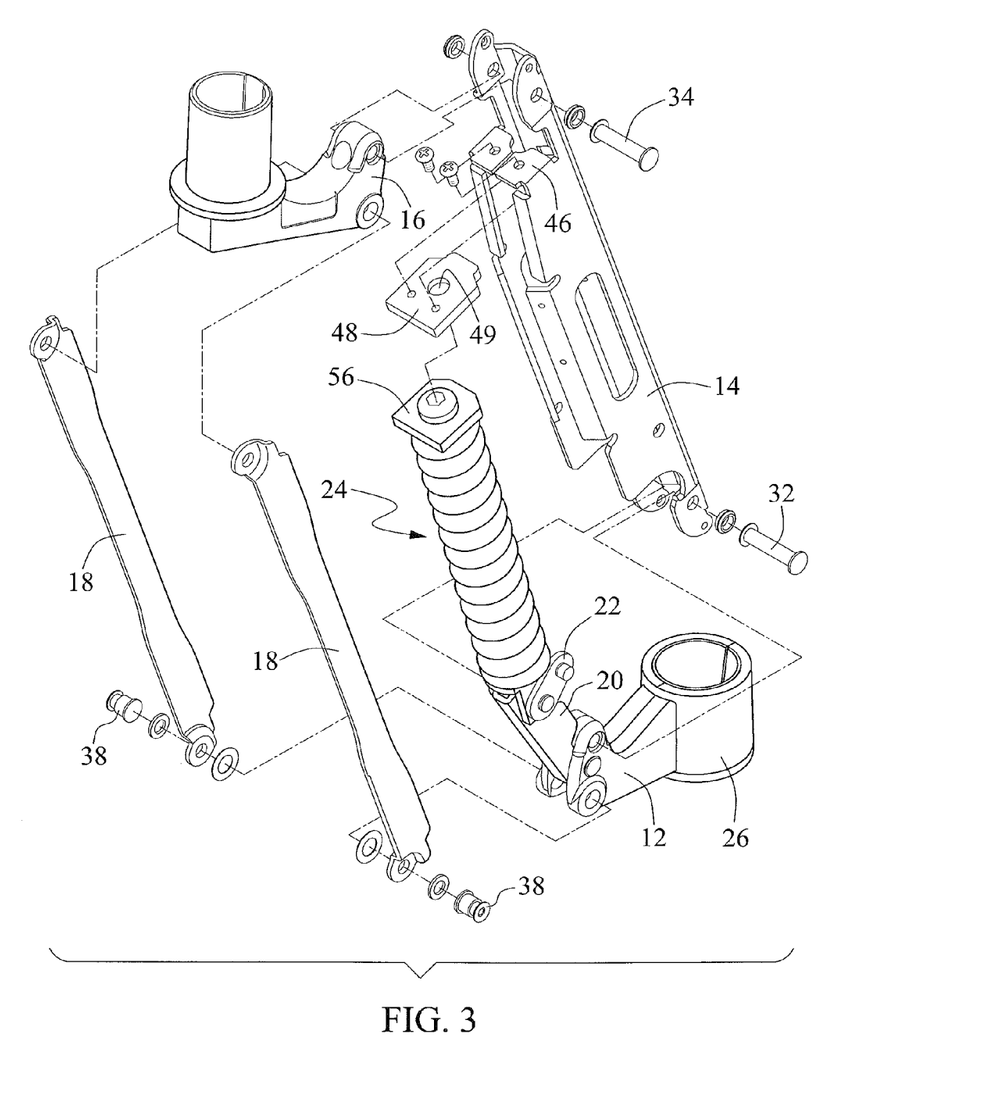
FIG. 3 is an enlarged partial view of the load-supporting apparatus illustrated in FIG. 2.
Figure 4:
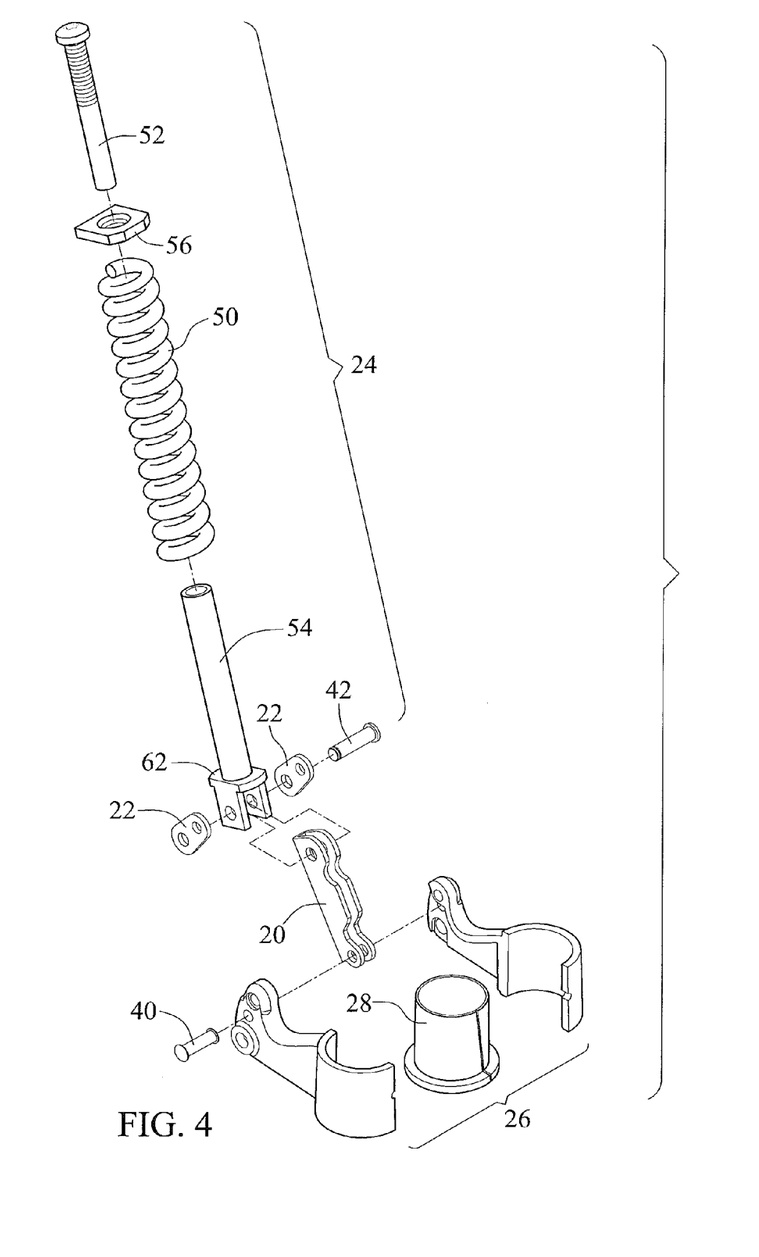
FIG. 4 is an enlarged partial view of the load-supporting apparatus illustrated in FIG. 3.

Each fin of lever 14 includes a transverse tab 46. A plate 48 is secured to transverse tabs 46 by screws for example. Plate 48 is formed with a cavity 47 and an aperture 49 in communication with cavity 47.

Extending device 24 includes a spring 50, a telescopic unit and a nut 56. The telescopic unit includes a rod 52 and a tube 54. Rod 52 includes an enlarged head 58 at an end and a thread 60 near head 58. Tube 54 includes a yoke 62 at an end. Yoke 62 includes two prongs. Nut 56 is engaged with thread 60. Both of rod 52 and tube 54 are inserted in spring 50 before rod 52 is inserted in tube 54. Head 58 is placed against plate 48 while yoke 62 is connected to levers 20 and 22 by rivet 42 so that spring 50 is compressed between nut 52 and yoke 62. Head 58 is partially placed in cavity 47 so that head 58 is kept in position.

Lever 14 is placed between levers 18. Lever 12 is placed between the fins of lever 14. A portion of lever 16 is placed between the fins of lever 14 while another portion of the same is placed between levers 18. The first end of pushing element 20 is placed between the fins of lever 12 while the second end of the same is placed between the prongs of yoke 62. Yoke 62 is placed between hanging elements 22. Extending device 24 is placed between the fins of lever 14. That is, extending device 24 is concealed by lever 14.

There is a collar 26 formed together with lever 12. In operation, collar 26 is placed around and on a stem 28.

Figure 5:
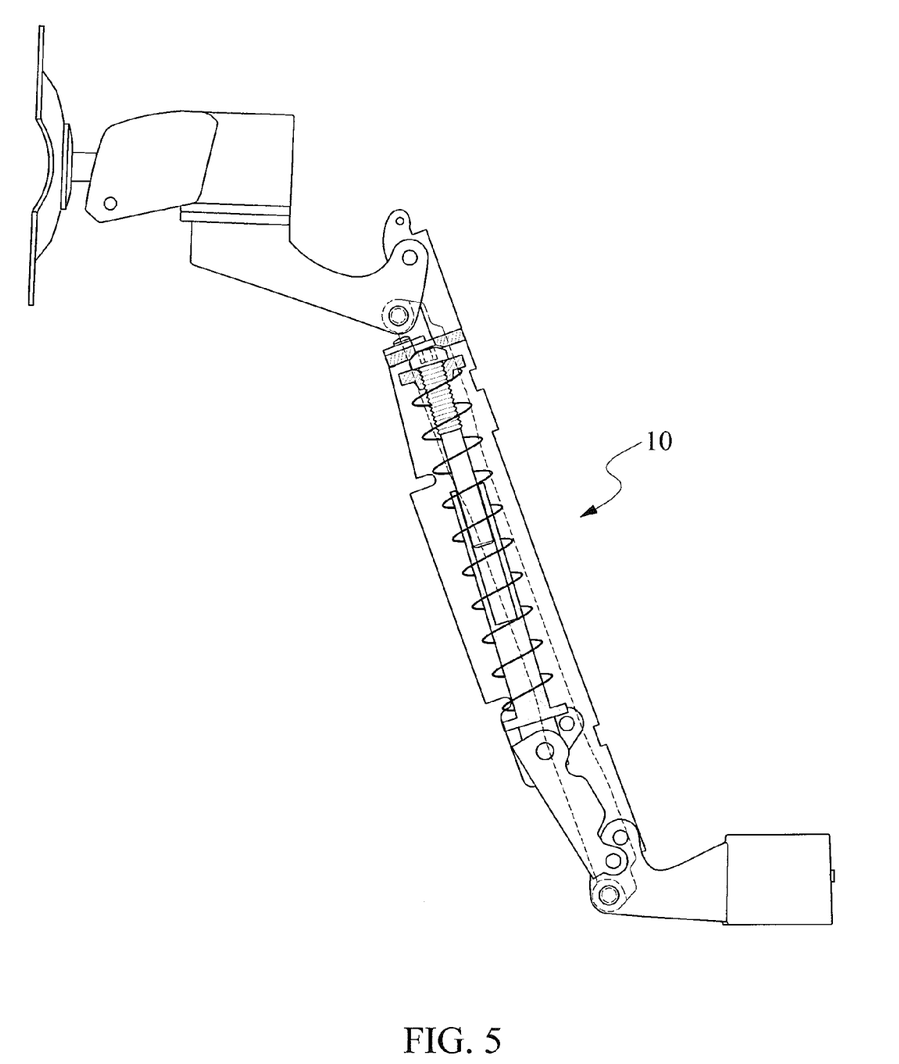
FIG. 5 is a cross-sectional view of the load-supporting apparatus shown in FIG. 1.

Referring to FIG. 5, load-supporting apparatus 10 is not loaded so that load-supporting apparatus 10 is in an upper position.

Figure 6:
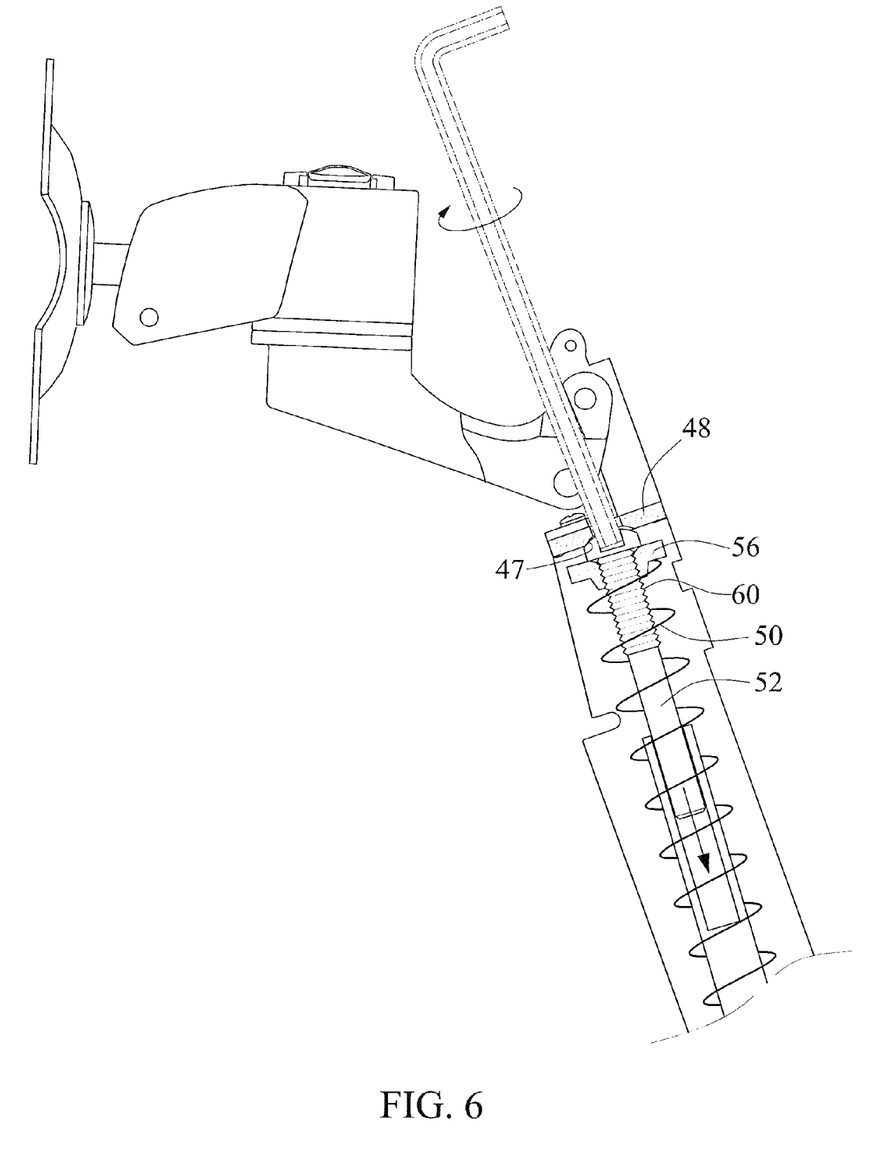
FIG. 6 is a cross-sectional view of an Allen key used to adjust the load-supporting apparatus shown in FIG. 5.

Referring to FIG. 6, an Allen key is inserted to a cavity made in head 58 through aperture 49. The Allen key is operable to rotate rod 52 in nut 56 so that nut 56 is moved on rod 52. The stress in spring 50 is adjusted.

Figure 7:
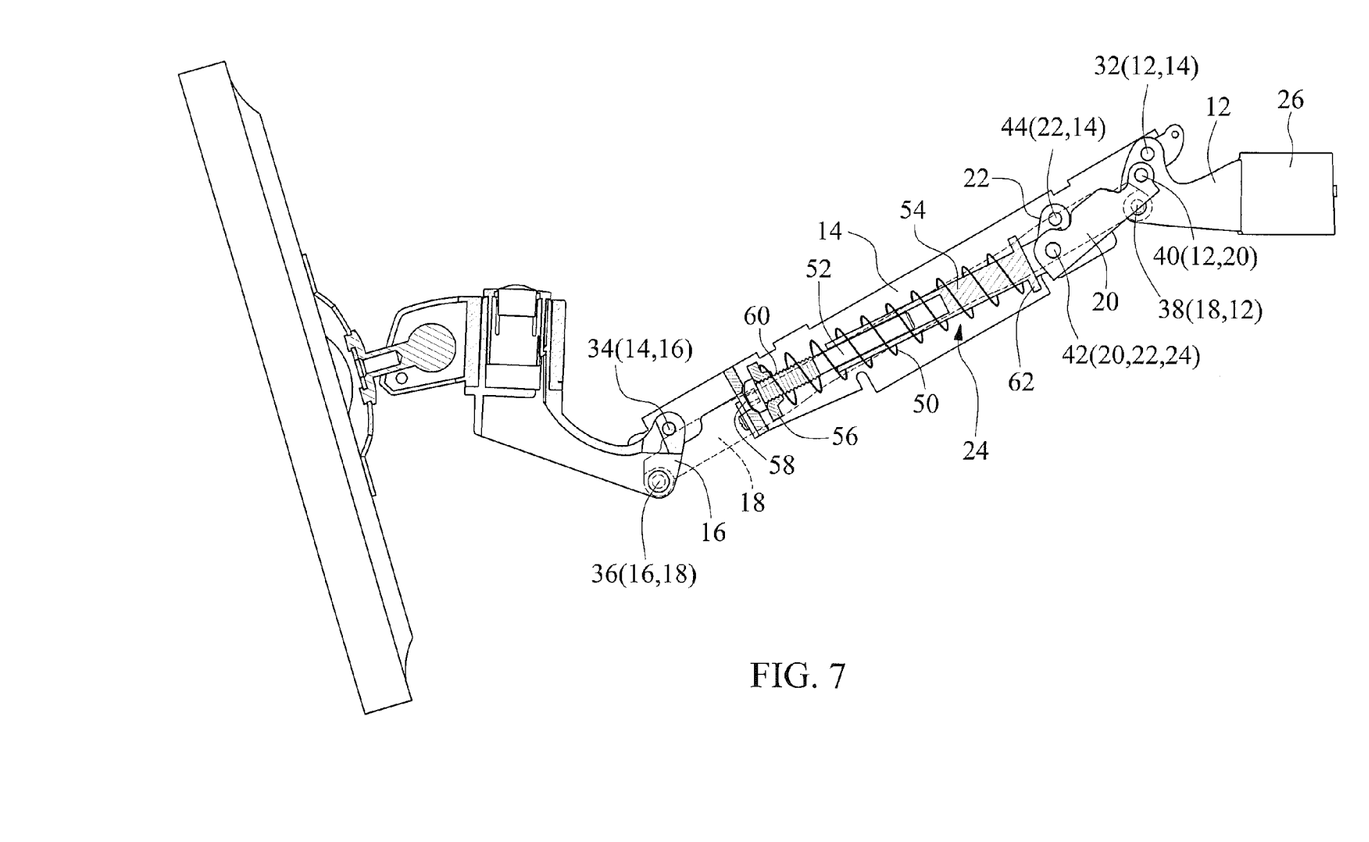
FIG. 7 is a cross-sectional view of the load-supporting apparatus in another position than shown in FIG. 5.

Referring to FIG. 7, a flat panel display is supported on load-supporting apparatus 10 so that load-supporting apparatus 10 is in a lower position.

Figure 8:
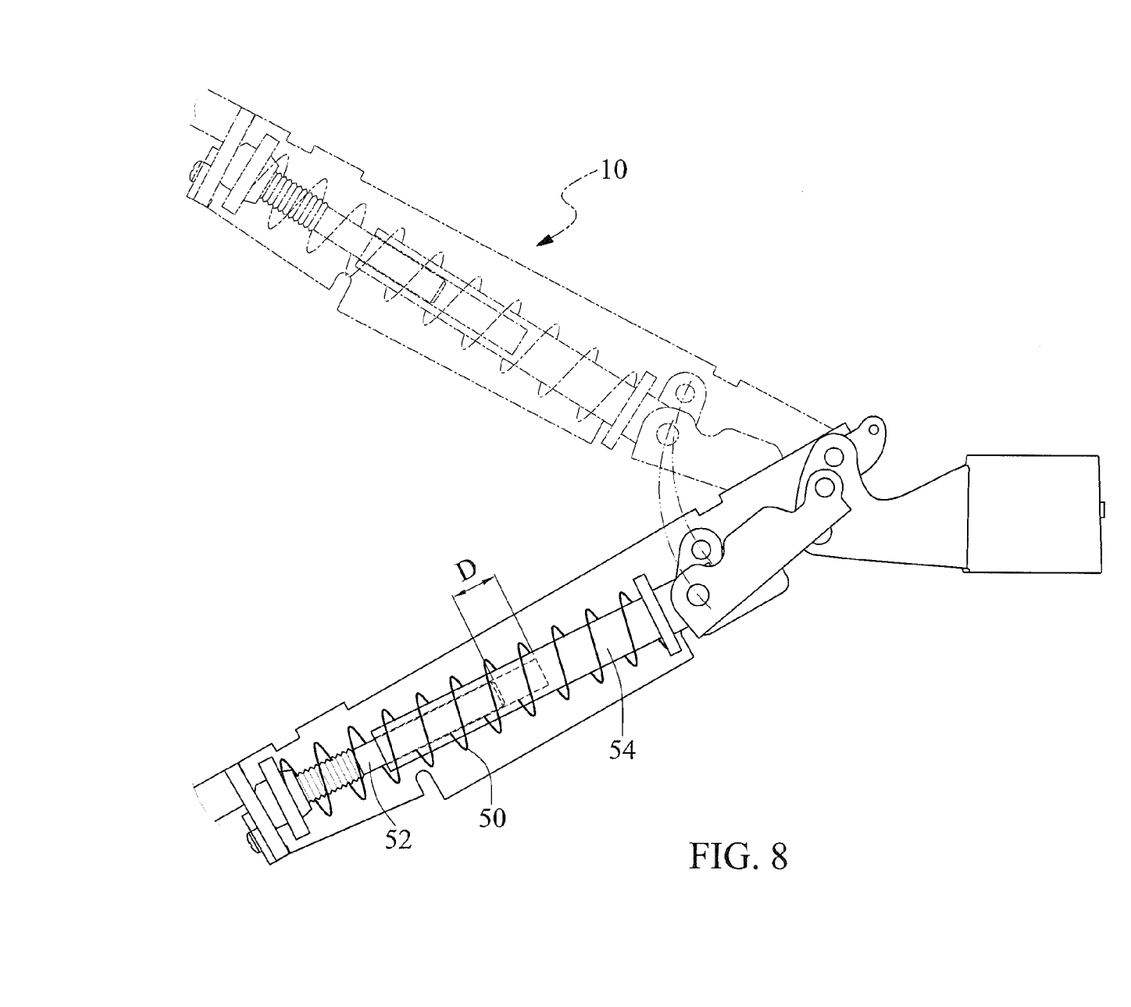
FIG. 8 is an enlarged partial view of the load-supporting apparatus in the position shown in FIG. 7 versus the position shown in FIG. 5.

Referring to FIG. 8, the lower position of load-supporting apparatus 10 is shown in solid lines while the upper position of load-supporting apparatus 10 is shown in phantom lines. There is a distance D between a free end of rod 52 and a closed end of a hole made in tube 54. Distance D is smaller in the lower position than the upper position. That is, the telescopic unit is shorter in the lower position than the upper position, and so is spring 50. Hence, spring 50 is compressed harder in the lower position than the upper position. That is, spring 50 exerts a larger force in the lower position than the upper position. The increase of the force compensates the weight of the flat panel display.

Referring to FIGS. 1 and 2, load-supporting apparatus 10 includes an arrangement for keeping wires (not shown) of the flat panel display neat. Load-supporting apparatus 10 includes a tubular shell 64 and two clips 66 for example. Tubular shell 64 consists of two halves. Tubular shell 64 includes a dovetail groove 68. Each clip 66 is formed with a dovetail 70 movably placed in dovetail groove 68. The wires of the flat panel display can be clipped by clips 66.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A load-supporting apparatus including:
   a four-bar linkage including:
      a first lever including first and second ends;
      a second lever including first and second ends, wherein the first end of the second lever is connected to the second end of the first lever;
      a third lever including first and second ends, wherein the first end of the third lever is connected to the second end of the second lever; and
      a fourth lever including first and second ends, wherein the first end of the fourth lever is connected to the second end of the third lever, wherein the second end of the fourth lever is connected to the first end of the first lever;
   a pushing element including first and second ends, wherein the first end of the pushing element is connected to a portion of the first lever between the first and second ends;
   a hanging element including an end connected to the second end of the pushing element;
   an extending device including first and second end, wherein the first end of the extending device is connected to the first end of the hanging element, wherein the second end of the extending device is placed against a portion of the second lever between the first and second ends;
   a first rivet for connecting the first lever to the second lever;
   a second rivet for connecting the second lever to the third lever;
   a third rivet for connecting the third lever to the fourth lever;
   a fourth rivet for connecting the fourth lever to the first lever;
   a fifth rivet for connecting the pushing element to the first lever;
   a sixth pin for connecting the pushing element, the hanging element and the extending device to one another; and
   a seventh rivet for connecting the hanging element to the second lever.

2. The load-supporting apparatus according to claim 1, wherein the four-bar linkage includes a collar formed together with the first lever, wherein the collar can be placed around and on a stem.

3. A load-supporting apparatus including:
   a four-bar linkage including:
      a first lever including first and second ends;
      a second lever including first and second ends, wherein the first end of the second lever is connected to the second end of the first lever;
      a third lever including first and second ends, wherein the first end of the third lever is connected to the second end of the second lever; and
      a fourth lever including first and second ends, wherein the first end of the fourth lever is connected to the second end of the third lever, wherein the second end of the fourth lever is connected to the first end of the first lever;

a pushing element including first and second ends, wherein the first end of the pushing element is connected to a portion of the first lever between the first and second ends;

a hanging element including an end connected to the second end of the pushing element; and an extending device including:
  a telescopic unit including:
    a rod including a head at an end and a thread near the head, wherein the head is placed against the second lever;
    a tube for receiving the rod, wherein the tube includes a yoke connected to the pushing element and the hanging element; and
    a nut engaged with the thread; and
  a spring compressed between the nut and the yoke.

4. The load-supporting apparatus according to claim 3, wherein the second lever includes two parallel fins each formed with a transverse tab, wherein the head is placed against the tabs.

5. The load-supporting apparatus according to claim 4, wherein the extending device is placed between the fins of lever.

6. The load-supporting apparatus according to claim 4, including a plate secured to the tabs and formed with a cavity for receiving the head.

7. The load-supporting apparatus according to claim 4, wherein each of the first and third levers and the pushing element includes two parallel fins, wherein the yoke includes two prongs, wherein the first lever is placed between the fins of the second lever, wherein the third lever is placed between the fins of lever, wherein the first end of the pushing element is placed between the fins of the first lever while the second end of the pushing element is placed between the prongs of yoke.

8. The load-supporting apparatus according to claim 7, including two hanging elements placed between the fins of the second lever, wherein the yoke is placed between the hanging elements.

9. A load-supporting apparatus including:
  a four-bar linkage including:
    a first lever including first and second ends;
    a second lever including first and second ends, wherein the first end of the second lever is connected to the second end of the first lever;
    a third lever including first and second ends, wherein the first end of the third lever is connected to the second end of the second lever; and
    a fourth lever including first and second ends, wherein the first end of the fourth lever is connected to the second end of the third lever, wherein the second end of the fourth lever is connected to the first end of the first lever;
  a pushing element including first and second ends, wherein the first end of the pushing element is connected to a portion of the first lever between the first and second ends;
  a hanging element including an end connected to the second end of the pushing element;
  an extending device including a first end connected to the end of the hanging element and second end placed against a portion of the second lever between the first and second ends;
  a shell for closing the four-bar linkage, the pushing element, the hanging element and the extending device, wherein the shell includes a dovetail groove; and
  at least one clip formed with a dovetail movably placed in the dovetail groove.

* * * * *